(12) United States Patent
Sarlin et al.

(10) Patent No.: US 11,458,788 B2
(45) Date of Patent: Oct. 4, 2022

(54) LIGHTWEIGHT SUSPENSION ASSEMBLY FOR A VEHICLE, AND MANUFACTURING PROCESS THEREOF

(71) Applicants: Aktiebolaget SKF, Gothenburg (SE); SKF Aerospace France S.A.S, Montigny-le-Bretonneux (FR)

(72) Inventors: Remi Sarlin, Allex (FR); Marco Falossi, San Raffaele Cimena (IT)

(73) Assignee: AKTIEBOLAGET SKF

( * ) Notice: Subject to any disclaimer, the term of this patent is extended or adjusted under 35 U.S.C. 154(b) by 483 days.

(21) Appl. No.: 16/510,258

(22) Filed: Jul. 12, 2019

(65) Prior Publication Data

US 2020/0047575 A1   Feb. 13, 2020

(30) Foreign Application Priority Data

Aug. 8, 2018   (IT) .................. 102018000007972

(51) Int. Cl.
   *B60G 3/18*   (2006.01)
   *B29C 45/14*   (2006.01)
   (Continued)

(52) U.S. Cl.
   CPC .......... *B60G 3/18* (2013.01); *B29C 45/14336* (2013.01); *B29C 45/14631* (2013.01);
   (Continued)

(58) Field of Classification Search
   CPC ....... B62D 7/18; B29C 45/0005; B29C 45/14; B29C 45/14008; B29C 45/14631;
   (Continued)

(56) References Cited

U.S. PATENT DOCUMENTS

| | | | |
|---|---|---|---|
| 8,910,759 | B2 | 12/2014 | Marquar et al. |
| 2002/0175487 | A1 | 11/2002 | Lawson |

(Continued)

FOREIGN PATENT DOCUMENTS

| | | | |
|---|---|---|---|
| CN | 201558927 U | * | 8/2010 |
| CN | 201807696 U | * | 4/2011 |

(Continued)

OTHER PUBLICATIONS

Search Report from Italy Patent Application No. 201800007972 dated Aug. 8, 2019.

*Primary Examiner* — James A English
*Assistant Examiner* — Matthew D Lee
(74) *Attorney, Agent, or Firm* — Reed Smith LLP

(57) ABSTRACT

A lightweight suspension assembly for a vehicle includes a suspension upright or knuckle provided with a bearing connection interface for receiving at least part of a wheel bearing, and with a first molded portion made of a first polymeric material; the assembly further includes at least one arm having a second molded portion made of a second polymeric material, and at least one joint member coupling the arm to the suspension upright/knuckle in such a manner to allow a relative rotation between the arm and the suspension upright/knuckle about at least one rotation axis (B); the first and second molded portions are arranged onto a first surface and, respectively, a second surface of the joint member, in such a manner that the first and second molded portions are coupled in a non-releasable manner to the joint member.

11 Claims, 6 Drawing Sheets

(51) Int. Cl.
*B29C 45/16* (2006.01)
*B60G 7/00* (2006.01)
*B62D 7/18* (2006.01)
*B29K 75/00* (2006.01)
*B29K 77/00* (2006.01)
*B29K 705/02* (2006.01)
*B29K 705/12* (2006.01)
*B29L 31/30* (2006.01)
*B60B 27/02* (2006.01)

(52) U.S. Cl.
CPC .......... *B29C 45/16* (2013.01); *B29C 45/1671* (2013.01); *B60G 7/008* (2013.01); *B62D 7/18* (2013.01); *B29K 2075/00* (2013.01); *B29K 2077/00* (2013.01); *B29K 2705/02* (2013.01); *B29K 2705/12* (2013.01); *B29L 2031/3002* (2013.01); *B60B 27/02* (2013.01); *B60G 2206/7101* (2013.01); *B60G 2206/73* (2013.01); *B60G 2206/81012* (2013.01)

(58) Field of Classification Search
CPC .............. B29C 45/16; B29C 45/14336; B29C 45/1671; B60G 2206/81012; B60G 2206/013; B60G 2206/73; B60G 2206/7101; B60G 2206/50; B60G 3/18
See application file for complete search history.

(56) References Cited

U.S. PATENT DOCUMENTS

| | | |
|---|---|---|
| 2016/0121927 A1 | 5/2016 | Schaake et al. |
| 2019/0176886 A1* | 6/2019 | Johnson .................... B62D 7/18 |
| 2020/0047576 A1* | 2/2020 | Warmerdam .......... B60G 7/008 |
| 2020/0047794 A1* | 2/2020 | Fleury .................. B60G 99/002 |
| 2020/0047796 A1* | 2/2020 | Falossi .................. B29C 53/564 |
| 2020/0049202 A1* | 2/2020 | Sarlin .................... B62D 7/166 |
| 2021/0229518 A1* | 7/2021 | Jeong ....................... B62D 7/18 |

FOREIGN PATENT DOCUMENTS

| | | | | |
|---|---|---|---|---|
| CN | 104276209 A | * | 1/2015 | ............... B62D 7/18 |
| CN | 103707925 B | * | 11/2015 | |
| EP | 0213367 | | 3/1987 | |
| JP | H01212603 | | 8/1989 | |
| JP | H06179314 | | 6/1994 | |
| WO | 2015017856 | | 2/2015 | |
| WO | WO-2021132785 A1 | * | 7/2021 | |
| WO | WO-2021133147 A1 | * | 7/2021 | |

* cited by examiner

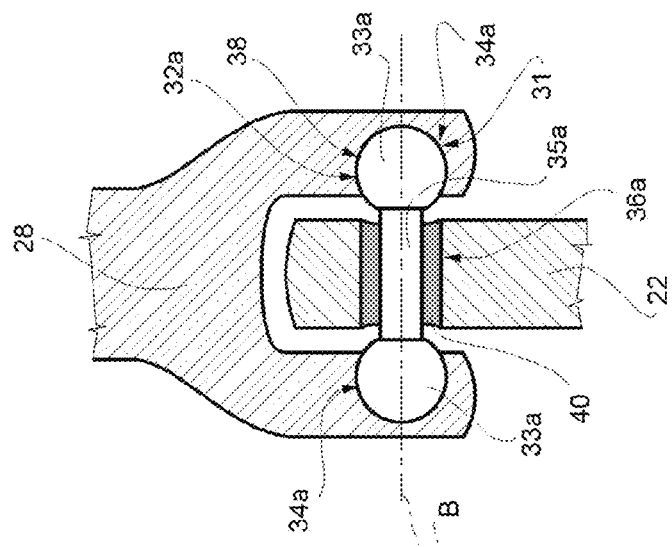
FIG. 4    FIG. 5
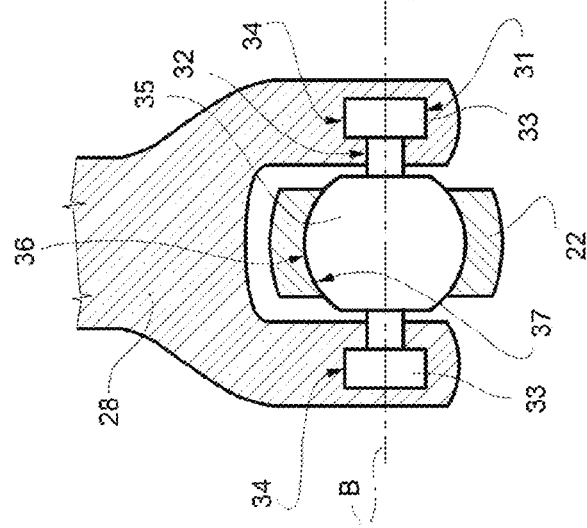
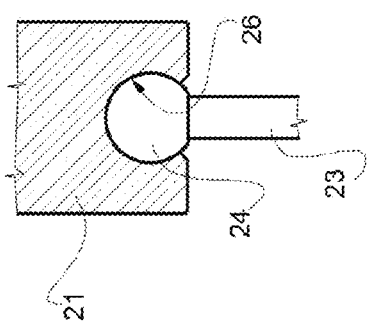
FIG. 3

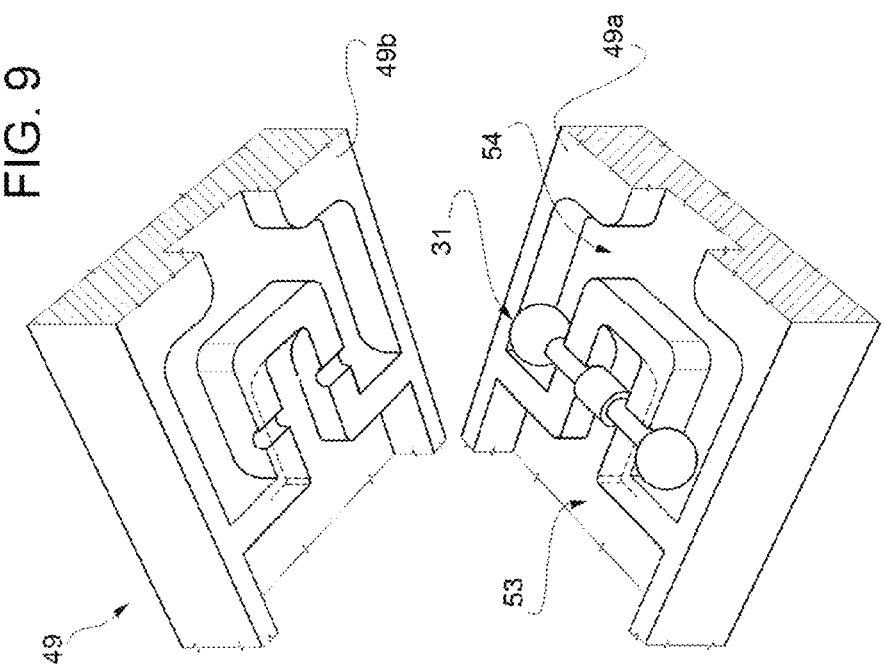
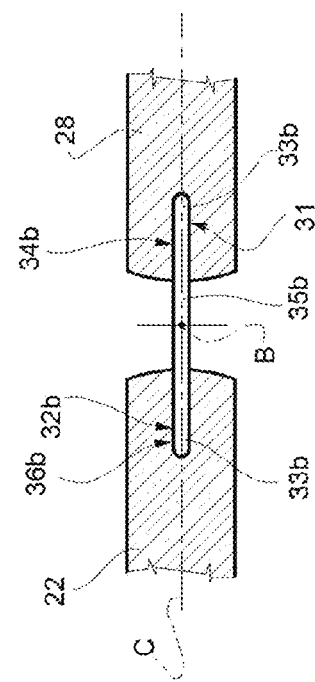
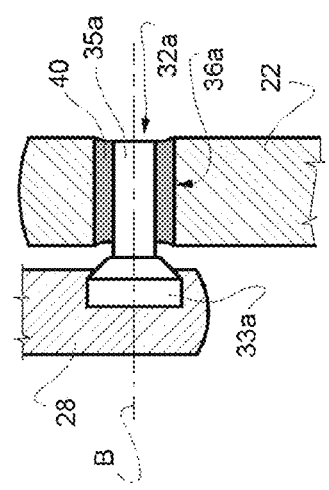

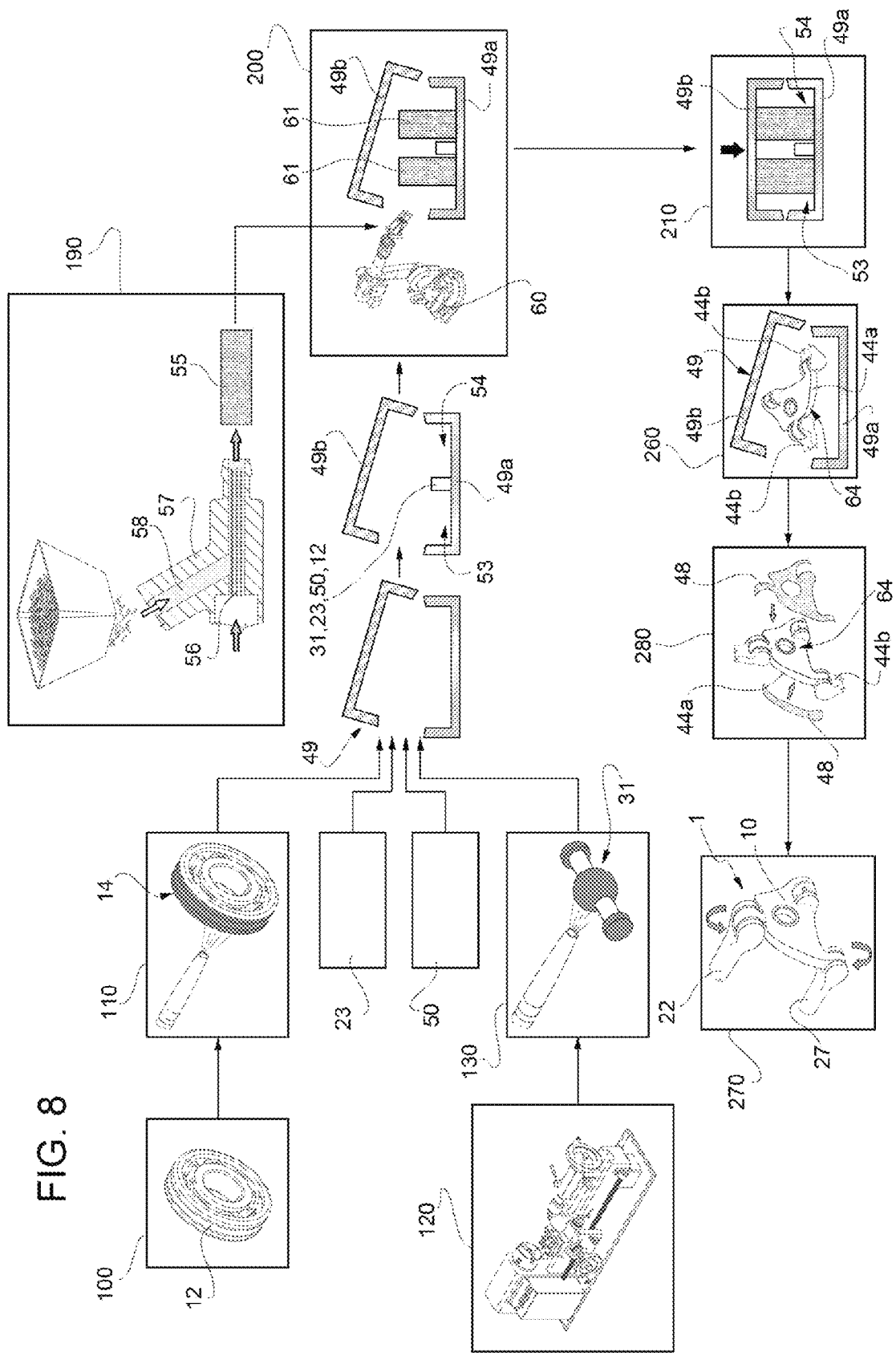

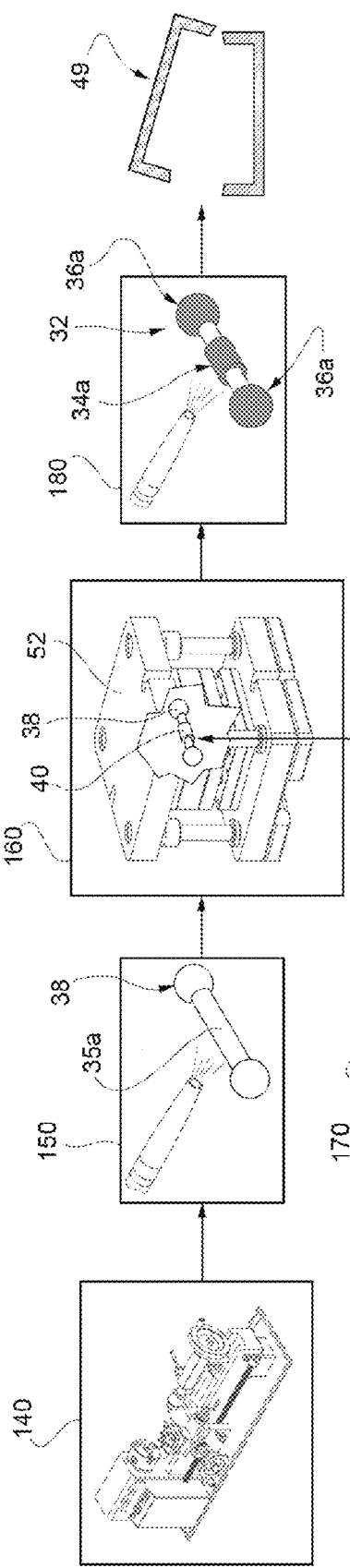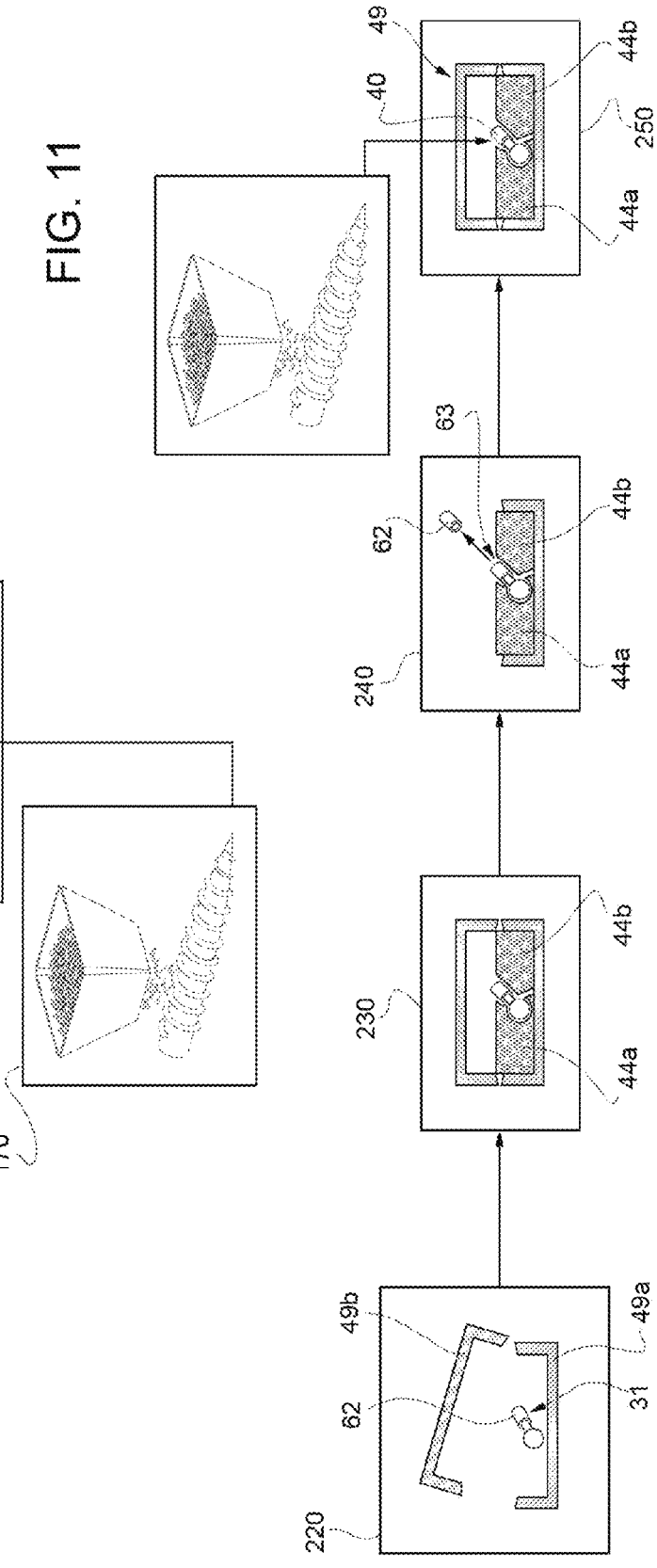

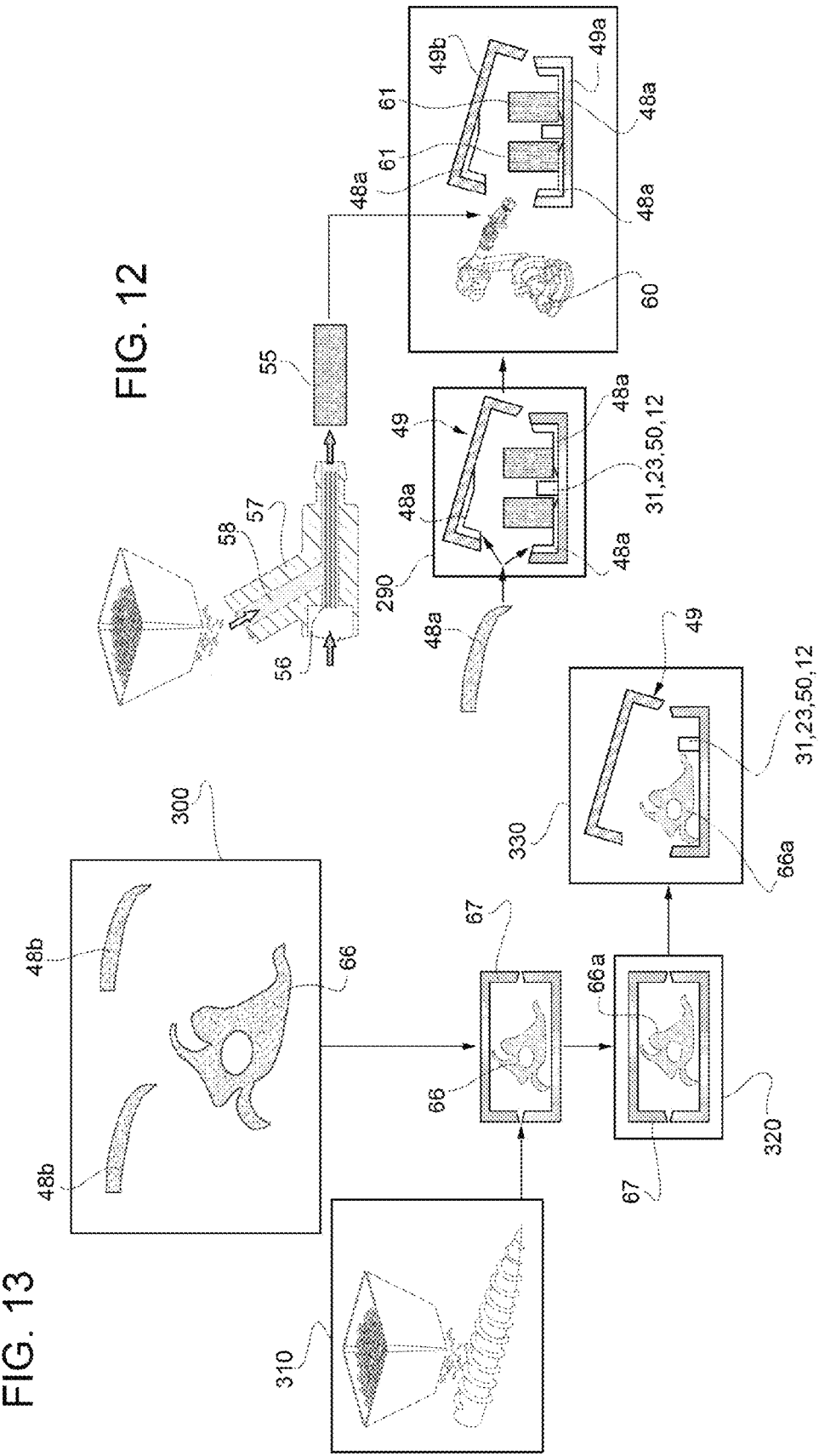

LIGHTWEIGHT SUSPENSION ASSEMBLY FOR A VEHICLE, AND MANUFACTURING PROCESS THEREOF

CROSS-REFERENCE TO RELATED APPLICATIONS

This application claims priority to Italian patent application no. 102018000007972 filed on Aug. 8, 2018, the contents of which are fully incorporated herein by reference.

FIELD OF THE INVENTION

The present invention concerns a lightweight suspension assembly for a vehicle.

BACKGROUND OF THE INVENTION

As it is known, e.g. from US2016121927A1, in the interests of fuel economy there is an increasing drive within the automotive industry towards weight reduction of the vehicle components and systems. One of such components is the steering knuckle that connects the wheel bearing to the vehicle suspension and, more in general, such components include all the uprights and arms of the vehicle suspension.

Typically, suspension uprights, suspension arms and steering knuckles are made of cast iron or of lightweight aluminum alloys, but there is still potential for weight savings by manufacturing these components from a more lightweight material, such as fiber-reinforced polymer.

However, with composite materials, components having generally complex shapes are more difficult and expensive to be manufactured, than steel or aluminum alloys components. Besides, fiber reinforced polymers, despite excellent mechanical properties, can hardly be manufactured at rates comparable with steel of aluminum processes. Moreover, the cost per weight unit of such materials is very high compared to steel or aluminum used in car structures.

This aspects reflect into increased manufacturing costs that partially discourage a large scale introduction of lightweight knuckles and suspension components into the global market.

Therefore, the need is felt to compensate those increased costs by developing different manufacturing strategies, which would allow at least a partial recovery of such costs without losses of mechanical performances of the final product.

In particular, some of the costs may be avoided or limited by reducing the number of process steps needed for obtaining the final product.

BRIEF SUMMARY OF THE INVENTION

In view of the foregoing, an object of the present invention is to provide a lightweight suspension assembly for a vehicle, that is relatively easy and cheaper to be manufactured, though ensuring, in use, an optimized resistance to operating stress.

According to the invention, a lightweight suspension assembly for a vehicle is provided.

Besides, a manufacturing process for manufacturing a lightweight suspension assembly for a vehicle is provided.

BRIEF DESCRIPTION OF THE SEVERAL VIEWS OF THE DRAWING

The present invention will now be described with reference to the accompanying drawings, which show a non-limiting embodiment thereof, in which:

FIGS. 3 and 4 are schematic cross-sections of details of the suspension assembly, such cross sections being taken along respective section planes indicated by and, respectively, IV-IV in FIG. 1;

FIGS. 5 to 7 are similar to FIG. 4 and schematically show respective variants of the detail in FIG. 4;

FIG. 8 is a diagram schematically showing a preferred embodiment of the process for manufacturing the lightweight suspension assembly according to the present invention;

FIG. 9 is a perspective and schematic view of a manufacturing step indicated in FIG. 8;

FIGS. 10 to 13 are diagrams showing some manufacturing steps regarding further embodiments of the process according to the present invention.

DETAILED DESCRIPTION OF THE INVENTION

Figure 1:
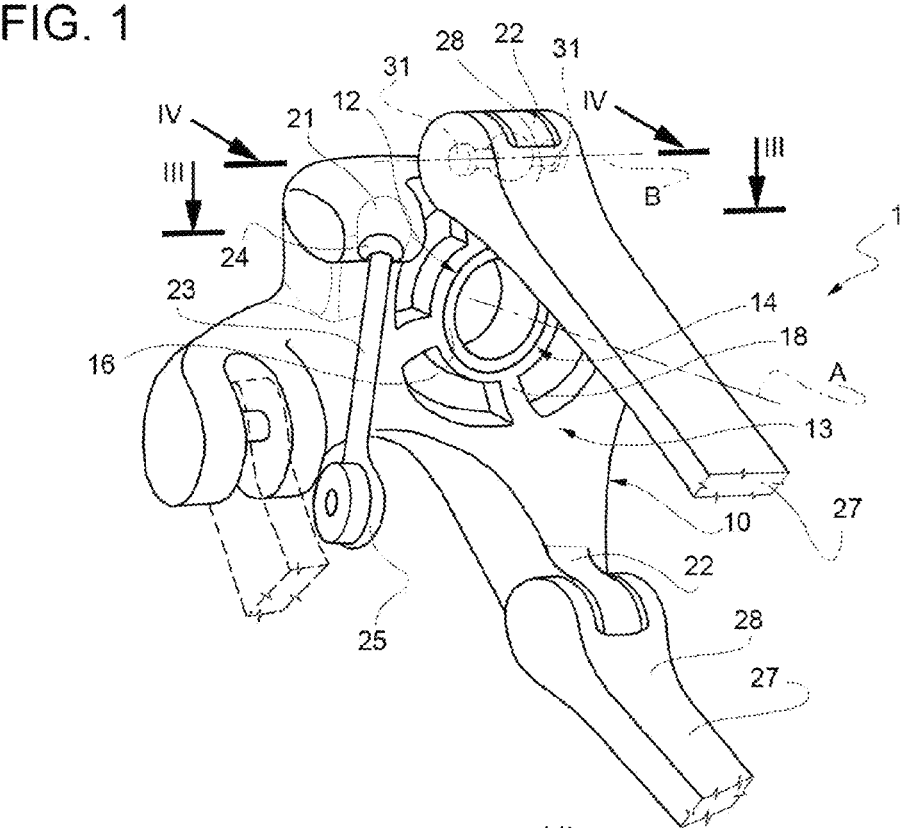
FIGS. 1 and 2 are front and rear perspective partial views of a preferred embodiment of the lightweight suspension assembly for a vehicle, manufactured according to the teachings of the present invention.
Figure 2:
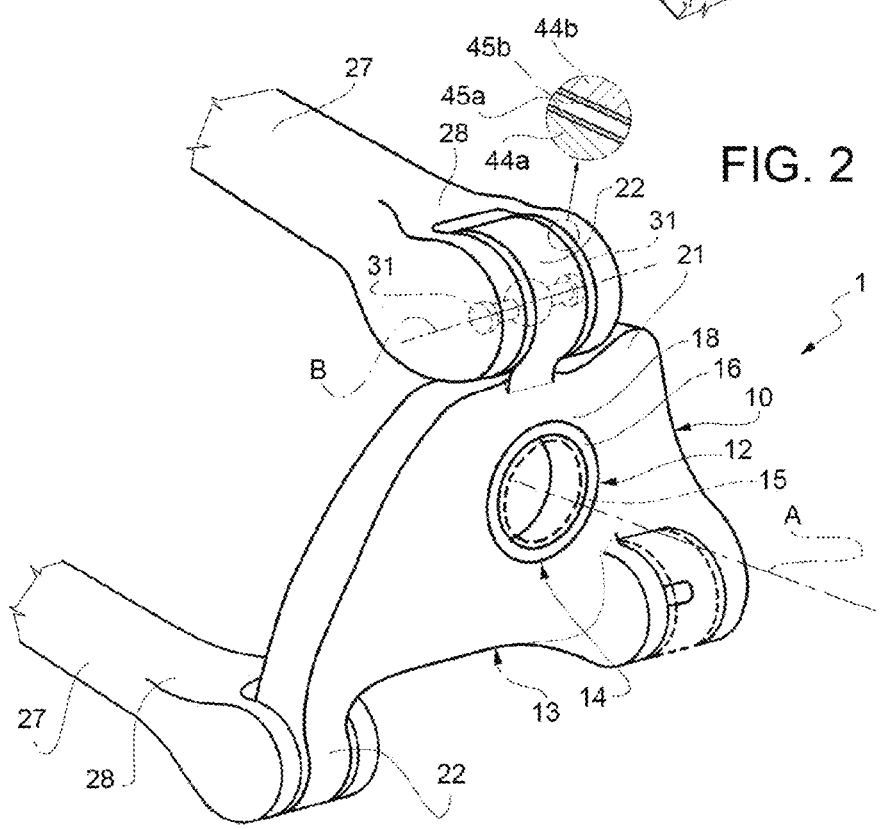

With reference to FIGS. 1 and 2, reference numeral 1 indicates, as a whole, a lightweight suspension assembly, which is part of a vehicle suspension system, partially shown for sake of simplicity. In the particular example that is shown, such suspension system is of the multi-link type. The suspension assembly comprises a suspension upright or steering knuckle 10, which is represented in a simplified and non-limitative manner, in order to clarify the concept on which the invention is based. Any suitable shape, even different from the shown embodiment, could be used in view of the specific vehicle and/or the specific kind of suspension system adopted for supporting the vehicle wheels. In other words, the present invention can be applied to different kinds of vehicle suspension (double wishbone suspension, MacPherson, etc.) and/or to different shapes of the upright/knuckle and, therefore, is not limited to the shown example.

According to an aspect of the invention, at least part of the upright/knuckle 10 is made of a fiber reinforced synthetic plastic resin. According to a preferred embodiment, the upright/knuckle 10 comprises a bearing connection interface 12 and a body 13 comprising polymeric material overmolded directly onto an outer lateral surface 14 of the bearing connection interface 12. In the present features and in the following description, the terms "polymeric material" are used to indicate either a composite material, i.e. a fiber reinforced polymer (e.g. reinforced by carbon or glass fibers), or a material made only of a polymer, or a mixtures of polymers, without fiber reinforcements.

The bearing connection interface 12 is configured to receive at least part of a wheel rolling bearing 15 (partially shown in dotted line in FIG. 2). The rolling bearing 15 is an HBU (Hub Bearing Unit) well known in the art and accordingly not shown and described in details for sake of simplicity.

According to a preferred embodiment, the bearing connection interface 12 is constituted by a sleeve element 16 made of metal (e.g. steel or an aluminum alloy) and having a cylindrical shape. The sleeve element 16 has an axis of symmetry A, which defines an axis of the upright/knuckle 10 and coincides, in use, with a rotation and symmetry axis of the wheel bearing 15.

In this case, therefore, the outer lateral surface 14 defines the sleeve element 16, and the body 13 is directly overmolded onto the sleeve element 16. By way of example, the sleeve element 16 consists of a steel outer ring of the wheel rolling bearing or HBU 15; in this case, the outer ring or sleeve element 16 is to be intended as schematic in the drawings, for sake of simplicity, so e.g. the tracks for the rolling bodies are not shown.

According to a variant, the sleeve element 16 receives in known manner, e.g. by interference fitting, an outer ring of the wheel bearing 15; in this case, the sleeve element 16 may be made of a fiber reinforced synthetic plastic, instead of being made of metal.

According to a variant, not shown, the bearing connection interface 12 comprises the sleeve element 16 and an annular interface body made of a composite polymeric material, i.e. a fiber reinforced resin, previously molded onto an outer surface of the sleeve element 16. In this case, preferably, the outer lateral surface 14 of the bearing connection interface 12 is coaxial with the sleeve element 16.

Preferably, the molded polymeric material of the body 13 is selected from the group consisting of BMC (Bulk Molding Compound), LFT (Long Fiber Thermoplastic) and DLFT (Direct Long Fiber Thermoplastic). BMC, as well as LFT/DLFT, are synthetic plastic materials in which individual reinforcing fibers of considerable length (usually ½ inch or 12 mm) are uniformly dispersed within a synthetic plastic matrix without a specific orientation (or oriented by the flow during the compression or injection molding but never arranged in layers) while, e.g., in SMC materials the fibers are arranged in layers. In BMC materials, the synthetic plastic matrix is generally formed by a thermosetting resin and such materials are adapted to be formed, generally, by compression molding; in LFT/DLFT materials the synthetic plastic matrix is formed by a thermoplastic resin and such materials are usually adapted to be formed by injection/compression molding. Moreover, in both the BMC and LFT materials the reinforcing fibers are of substantially uniform length.

Preferably, in the final molded product the individual reinforcing fibers form groups of fibers aligned with respect to each other, and the groups are uniformly dispersed randomly in the polymeric matrix, in order to give rise to a nearly isotropic material.

The body 13 comprises a radially inner annular portion 18 which is mechanically coupled to the outer lateral surface 14, preferably by overmolding. The upright/knuckle 10 further comprises an attachment portion 21 and at least one attachment portion 22. The attachment portions 21 and 22 are arranged in fixed positions with respect to the lateral outer surface 14 and comprise a molded polymeric material. In the preferred embodiment, the attachment portions 21 and/or 22 are parts of the body 13, i.e. they are formed by compression molding or injection molding as a single piece with each other and with the annular portion 18. According to not shown variants, an additional and distinct structure can be provided in the upright/knuckle to connect the attachment portions 21 and/or 22 to each other and/or to the lateral outer surface 14.

As schematically shown in FIGS. 1 and 3, in combination with the attachment portion 21, the assembly 1 further comprises a link arm or rod 23, which is preferably made of metal (e.g. steel or aluminum alloy) and comprises two opposite connecting end portions 24 and 25. End Portion 24 is connected in rotational manner to the attachment portion 21, while end portion 25 is suitable to be connected (in a manner that is known and, therefore, is not described in detail) to an anti-roll bar (not shown) of the vehicle suspension system. Preferably, the attachment portion 21 defines a seat 26 (FIG. 3) engaged in a rotational manner by the end portion 24; the shapes of the seat 26 and the end portion 24 are substantially spherical, so as to define a ball joint. More preferably, as it will be clearer from the below description, the attachment portion 21 is overmolded onto the end portion 24, without the need of assembling steps between the upright/knuckle 10 and the arm 23 during the manufacturing process of the assembly 1.

According to a variant, not shown, the attachment portion 21 and the arm 23 are not provided.

With reference again to FIGS. 1 and 2, according to an aspect of the invention, the assembly 1 further comprises one or more arms 27 (partially shown) coupled to the attachment portions 22 (three in the non-limitative shown example). By way of example, arms 27 can be defined by support arms of the vehicle suspension, as shown in the drawings, and/or by a control arm of the vehicle steering system (not shown).

The following description refers to one of the arms 27, only for sake of simplicity, as its features can be applied to all the other arms 27.

Preferably, the whole arm 27 is made of a polymer reinforced by fibers. The arm 27 comprises an end portion 28, which comprises a molded polymeric material and is connected in a rotational manner to the corresponding attachment portion 22 by a respective joint member 31, defining a joint that allows freedom of relative rotation between the upright/knuckle 10 and the arm 27 about at least one rotation axis B.

The joint member 31 is configured to define a pivot joint, or a ball joint, or an elastically deformable joint, as it will be evident from the embodiments described below. In the embodiment of FIG. 4, the joint member 31 is defined by a pin member 32, which is elongated along axis B, is preferably made of metal (e.g. steel) and comprises two opposite axial end portions 33, having respective outer surfaces 34, and an intermediate portion 35 having an outer surface 36, separate from surfaces 34.

The attachment portion 22 of the upright/knuckle 10 is arranged, by overmolding, onto surface 36 of the intermediate portion 35 so as to be coupled in a non-releasable manner.

Preferably, the attachment portion 22 is coupled to the surface 36 so as to slide in rotational manner and, more preferably, defines a seat 37 engaged by the intermediate portion 35. In particular, the shapes of the seat 37 and the surface 36 are substantially spherical or semi-spherical, so as to define a ball joint. To provide sliding, the metal surface 36 should have sufficient smoothness to prevent any bonding of the polymeric material during molding of the attachment portion 22. For this purpose, and for improvement of compliance and mechanical performance purposes, an interface layer or coating can be provided between the metallic surface 36 and the polymeric material. This interface layer can be a tribological liner deposited on surface 36 before molding, or a tribological thermoplastic or thermoset resin liner directly injected in a possible gap between the surface 36 and the already molded polymeric material.

The end portion 28 is fork-shaped and, similarly to the attachment portion 22, is overmolded onto the end portions 33 so as to be coupled in a non-releasable manner. In particular, the end portion 28 is coupled to surfaces 34 in a fixed manner; for this purpose, preferably surfaces 34 have non-cylindrical shape and/or geometrical features such as, but not limited to, splines, grooves, surface porosity, chemical preparation, so as to ensure grip of the molded end portion 28 onto the end portions 33.

As an alternative or in combination with the sliding coupling between portions 22 and 35, a rotationally sliding coupling could be provided between the portions 28 and 33.

In the embodiment shown in FIG. 5, the joint member 31 is defined by a pin member 32a comprising a metal pin element 38 with opposite end portions 33a (similar to end portions 33) having outer surfaces 34a. The pin member 32a further comprises a bushing 40 arranged onto an intermediate portion 35a of the pin element 38 in a fixed position. The bushing 40 has an outer surface 36a, onto which the attachment portion 22 is coupled, by overmolding, in a non releasable and fixed manner. The bushing 40 is made of a elastically deformable polymer, preferably an elastomer (e.g a thermoplastic polyamide elastomer, or a thermoplastic polyurethane elastomer, or a natural rubber, or a synthetic rubber like nitrile rubber). In particular, the material of the bushing 40 is overmolded onto the intermediate portion 35a, as it will be described below. The elastic deformation of the bushing 40 allows relative rotation between the arm 27 and the upright/knuckle 10 about axis B so as to define an elastically deformable joint. In other words, the elastomer is strained during use and allows a certain movement stroke between the connected components. In the meantime, deformation of the bushing 40 compensates for possible misalignments and/or dampens vibrations. Preferably, this embodiment does not include sliding or rolling surfaces.

According to a variant (not shown), a metal element is fitted in fixed position onto the bushing 40 and defines the outer surface 36a, onto which the attachment portion 22 is overmolded in a fixed position.

According to further embodiments, not shown, the end portion 28 of the arm 27 is overmolded onto the surface 36 (or 36a); and the attachment portion 22 is fork-shaped and is overmolded onto the surfaces 34 (or 34a).

According to a variant of the pin member 32a, schematically shown in FIG. 6, none of the attachment portion 22 and the end portion 28 is fork-shaped; and only one of the two end portions 33a is provided.

According to a variant, not shown, the joint member 31 is defined by a bushing, having the same features of bushing 40, without metal elements: the attachment portion 22 and the end portion 28 are fixed directly, thanks to overmolding techniques, to an inner surface and to an outer surface of such bushing.

According to a further embodiment, schematically shown in FIG. 7, the joint member 31 is defined by a flexible member 32b which has an elongated shape along an axis C, perpendicular to axis B, and comprises two opposite end portions 33b and an intermediate portion 35b, which is elastically deformable so as to define a virtual hinge or virtual pivot joint about axis B, so as to allow relative rotation between the end portions 33b. For this purpose, at least the intermediate portion 35b is made of an elastically deformable material, e.g. a thermoplastic elastomer or a flexible composite material. In particular, the intermediate portion 35b has a flat shape, relatively thin along a direction orthogonal to axes C and B, so as to bend about axis B.

The end portions 33b (preferably without metal material) are embedded in the molded attachment portion 22 and, respectively, in the molded end portion 28. In other words, the end portions 33b have respective surfaces 34b and 36b onto which the attachment portion 22 and the end portion 28 are respectively coupled, by overmolding, in a fixed and non-releasable manner.

As mentioned above, the body 13 of the upright/knuckle 10 and the arm 27 are made of polymers reinforced by fibers (e.g. glass/carbon fibers). As schematically shown in an enlarged detail in FIG. 2, the body 13 and the arm 27 comprise respective molded portions 44a,44b (defining respectively the attachment portion 22 and the end portion 28) and, preferably, respective reinforcement portions 45a, 45b, which are obtained during the manufacturing process by providing tapes or sheets 48,48a,48b (FIGS. 8, 12 and 13) comprising reinforcing fibers.

In order to obtain the assembly 1, there can be different embodiments during the manufacturing process.

According to a preferred embodiment, as schematically shown in the diagram of FIG. 8, the following components are manufactured, along parallel lines, and transferred into a mold 49:

the bearing connection interface 12 (preferably together with the whole bearing 15), the joint member 31, the possible link rod 23, and possible electronics/electric components 50 (such as sensor to be integrated into the assembly 1).

In particular, after having machined/assembled the bearing connection interface 12 (block 100), preferably the outer lateral surface 14 is treated (block 110) so as to produce an effective bonding or grip with polymeric material to be molded afterwards in the mold 49. In particular, the outer lateral surface 14 is knurled or lettered or otherwise machined using mechanical, chemical or optical processes, such as to create thereon interlocking mechanical means, e.g. a surface texture and/or grooves, ribs or pins which may receive/be embedded in the molded polymeric material of the annular portion 18. By way of example, texturizing by laser is provided (e.g. to form cone-shaped protrusions/cavities). In combination or as an alternative to interlocking mechanical means, a surface activation chemical bonding primer is applied, and/or plasma pre-treatment is provided, on surface 14.

As far as the preparation of the joint member 31 is concerned, in the embodiment of pin member 32, the latter is manufactured by machining operations (block 120) and preferably by treating surfaces 34 and/or 36 (block 130). In particular, surfaces 34 can be treated just as mentioned above for surface 14, to increase bonding or grip with molded material; surface 36 is preferably treated to improve smoothness, e.g. by grinding, and/or by applying an anti-friction coating or liner as already mentioned above.

In the embodiment of pin member 32, as schematically shown in FIG. 10, pin element 38 is machined (block 140), e.g. by machining a XC45 steel, and preferably is treated at the intermediate portion 35a (block 150), just as described above for surface 14, to increase surface bonding and/or grip. Pin element 38 is then transferred and placed into a dedicated mold 52 (block 160), where the bushing 40 is formed by injection molding, i.e. polymeric material is overmolded onto the intermediate portion 35a. In particular, the material of the bushing 40 is previously produced by extrusion, e.g. starting from elastomer pellets (block 170). After extraction from the injection mold 52 and before transfer to mold 49, preferably surfaces 34a and/or 36a are treated (block 180), just as described above for surface 14, so as to increase bonding and/or grip of the polymeric material to be formed in mold 49.

With reference again to FIG. 8, preferably mold 49 comprises a lower half 49a and an upper half 49b, each defining a respective half footprint of the full assembly 1 to be produced, extended in a horizontal orientation, i.e. with the arms 27 unfolded/pivoted about axes B, with respect to the normal use configuration of the assembly 1. Therefore, all the components to be integrated in the assembly 1 (i.e. the bearing connection interface 12, the joint member 31, the possible link rod 23, the possible electronics/electric components, etc.) are placed onto the lower half 49a.

As schematically shown in FIG. 9, when the joint member 31 is arranged in its place in the mold 49, the mold inner space is split in at least two distinct and isolated spaces 53 and 54 (for forming respectively the molded portions 44a, 44b).

With reference again to FIG. 8, in order to form the molded portions 44a,44b, at least one bulk polymeric material 55 is prepared (block 190), by way of example according to direct long fiber material manufacturing technics, in which continuous fibers 56 (e.g. glass or carbon fibers) are drawn into an extruder 57, e.g. a worm extruder. In the meantime, the extruder 57 is heated and driven to compress a pure polymer 58. By way of example, polyamide pellets are melted (at about 215° C.) and compressed inside the heated extruder 57. During compression, the melted polymer 58 is mixed with the continuous fibers 56: in particular, the mix is composed of 10% of carbon fiber, 20% of glass fiber and 70% of polyamide. The bulk material 55, made of hot (near 215° C.) and soft polymer and fiber mix, is therefore extruded.

As a variant, other thermoplastic polymers (PPA, PPS, etc.) could be used instead of a polyamide.

The bulk material 55 is then transferred towards the mold 49, e.g. on a conveyor belt (not shown) to a robot arm 59, suitable to dispense at least one portion 61 of the received bulk material 55 onto the footprint of the lower half 49a, for each molded part to be formed (block 200). The volumes of the portions 61 placed into the mold 49 are dosed so as to be almost equal to the volumes of the spaces 53,54 to be filled in.

According to a variant, different bulk materials, i.e. transferred from different extruders, can be arranged in the mold 49, e.g. to form molded parts made of different polymeric materials.

The portions 61 of polymeric material are then molded by compression molding (bloc 210), i.e. by completely closing the mold 49 by moving the upper half 49b towards to the lower half 49a. During this step, the material of portions 61 is compressed between the lower half 49a and the upper half 49b and therefore forced to flow throughout the spaces 53 and 54 so as to fill in all the gaps and take the shape of such spaces 53,54.

In the meantime, preferably, the mold temperature is controlled so as to be lower than the glass transition temperature of the polymer material that is being molded; by way of example the mold temperature is controlled so as to be at about 80° C.

The compression is applied for a pre-set time (by way of example 40 seconds) required to guarantee complete filling of the cavities in the mold 49 and reach correct density according to material specification. Indeed, during this time, the molded polymer materials cool down: therefore, the molded portions 44a and 44b are set and solidify, and they are consequentially connected to each other by the joint member 31, without any further operation.

According to further embodiments (not shown):

the polymeric material is molded by injection, i.e. it is injected by pressure into the mold 49 when the latter is at least partially closed (instead of being placed and/or dispensed onto the open lower half 49a and afterwards molded by compression); by way of example, in the injection molding, the mold temperature is controlled to be at about 100° C., and the polymeric material is injected at a temperature of about 300° C.; and/or the polymeric material is a pure polymer injected into the mold 49, e.g. in the form of pellets so as to be melted directly during this injection step; and/or the polymeric material is a short fiber reinforced polymer, instead of having continuous fibers; and/or the polymeric material of the upright/knuckle 10 and the polymeric material of the arm 27 are molded onto the joint member 31 not at the same time (e.g. they are molded by two subsequent molding steps in the same mold 49, or by subsequent molding steps in two different molds with a transfer step for transferring the intermediate product between the two molds, in any case without assembling steps).

According to a further embodiment, schematically shown in FIG. 11, the bushing 40 of FIG. 6 (or the flexible member 32b of FIG. 7, in a similar manner) is formed by injection in the mold 49, after having molded the polymeric material of the upright/knuckle 10 and the arm 27: the joint member 31, which is placed in the mold 49 (block 220), comprises a removable insert 62 having the same position, size and shape as the polymeric material to be formed (i.e. the same position, size and shape as the bushing 40, or the flexible member 32b); at least one of the polymeric materials of the upright/knuckle 10 and the arm 27 is overmolded, by injection or by compression molding, onto the removable insert 62 (block 230) so as to form the molded portions 44a and 44b; afterwards, the mold 49 is opened, and the insert 62 is removed (block 240), so as to free a space 63 within the mold 49; finally, after having closed again the mold 49, a polymeric material, e.g. an elastomer, is injected into such free space 63 (block 250), so as to form the elastically deformable joint element, i.e. the bushing 40 (or the flexible member 32b). Therefore, in this case, the elastomer of the bushing 40 (or the elastically deformable composite material of the flexible member 32b) is overmolded onto the arm 27 and/or the upright/knuckle 10.

With reference to FIG. 8, after the molding steps, the mold 49 is opened, i.e. the upper half 49b is raised (block 260). After having opened the mold 49, a molded product 64 is extracted or ejected from the lower half 49a, as a module already assembled. In other words, after the molding steps the molded portion 44b of the arm 27 results in being automatically connected to the molded portion 44a of the upright/knuckle 10. Indeed, the polymeric material of the upright/knuckle 10 and the polymeric material of the arm 27 are coupled directly onto the joint member 31, thanks to the overmolding operations, in a non-releasable manner. In the meantime, at least one degree of freedom is present between the arm 27 and the upright/knuckle 10. In particular, when the joint member 31 is defined by the pin member 32, the latter is fixed to one of the two components and is able to pivot or rotate with respect to the other one of the two components.

After extraction from the mold 49, when the joint member 31 is defined by the pin member 32, the arms 27 are pivoted and folded with respect to the upright/knuckle 10 (block 270), to be brought to the desired position to be mounted on the vehicle (on the other hand, in all the other embodiments described for the joint member 31, the latter is fixed to both the components, so that the position/configuration of the parts in the mold 49 has to be the same as the position/configuration occurring during use).

It is therefore evident that, thanks to the invention, the components of the assembly 1 are manufactured and assembled at the same time. No additional assembling step are necessary to mount the arms 27 onto the upright/knuckle 10.

As mentioned above, preferably also reinforcement portions 45a,45b are manufactured. In this regard, according to a preferred embodiment, tapes or sheets 48 are arranged, where required, onto the external surface of the molded product 64 extracted from the mold 49 (block 280). Such tapes or sheets 48 are defined by plies or mats of fibers pre-impregnated with a thermoplastic polymer (e.g. PA66, PPA, PPS, etc.). By way of example, the tapes or sheets 48 are cut from a continuous band, e.g. with a width of about 25.4 mm, having uni-directional fibers (e.g. carbon fibers) impregnated with PA6.

Before being applied, the tapes or sheets 48 are warmed up to the glass transition temperature of their polymer, so the tapes or sheets 48 can bond on the outer surface of the molded parts extracted from the mold 49. After being applied, the tapes or sheets 48 form a skeleton, shaped as a shell or a coating on the outer surface of the product 64.

According to another embodiment, schematically shown in FIG. 12, reinforcement elements defined by tapes or sheets 48a are placed on the footprint of the mold 49, i.e. on the inner surfaces of the spaces 53,54, in desired/requested areas, in such a manner to form the skeleton or shell (block 290). Before being positioned into the mold 49, the tapes or sheets 48a are warmed up to the glass transition temperature of their polymer (e.g. 210° C.): thanks to this heating, the tapes or sheets 48a become tacky and formable, can be given the desired shape and can bond together to form the above mentioned skeleton or shell. Preferably, after being positioned into the mold 49, the material of the tapes or sheets 48,48a is formed by pressure onto the inner surfaces of the mold 49 to imprint the shape. During the following molding steps, the polymeric materials of the upright/knuckle 10 and/or the arm 27 are overmolded and bond to the material of the pre-formed tapes or sheets 48a.

According to a further embodiment, schematically shown in FIG. 13, tapes or sheets 48,48a are replaced by dry tapes or sheets 48b, i.e. elements made only by fibers, without polymers. Tapes or sheets 48b are coupled to each other, thanks to a binder, and shaped so as to form a skeleton 66 (block 300). The latter is preferably heated (e.g. at about 150° C.) to keep the given shape. The skeleton 66 is then placed in a dedicated mold 67, that preferably is partially closed so as to leave a gap, e.g. a 2 mm gap, between the skeleton 66 and the inner surface of the mold 67. A polymer, e.g. a liquid acrylic resin, is then injected into the mold 67 (block 310). The closure of the mold 67 is then completed (block 320) so that the resin penetrates the fibers of the skeleton 66. For the same purpose, in the meantime, the mold 67 is heated, e.g. at about 80° C. for 10 minutes.

After having opened the mold 67 and having demolded the impregnated skeleton 66a, the latter is transferred and positioned into the mold 49 (block 330). Afterwards, the polymeric material of the upright/knuckle 10 and/or the arm 27 is overmolded onto the skeleton 66a, according to the techniques disclosed above, so as to bond to the skeleton 66a. In this case, the skeleton 66a can be embedded inside the molded portions 44a,44b, instead of being placed on the outer surfaces of such molded portions 44a,44b, as a shell.

As it is evident from the above features, as mentioned above, the upright/knuckle 10 and the arms 27 are manufactured and assembled at the same time, thanks to the overmolding techniques. Therefore, it is possible to save costs and time by avoiding the assembling steps and by reducing as much as possible the number of manufacturing operations to be carried out.

In the meantime, the use of composite polymeric materials allows a significant weight reduction for the suspension components, with respect to metal components, without reducing the stiffness and resistance. Besides, the use of composite polymeric materials allows to have more flexibility in designing the shapes of the components, with respect to metal components, so that improved optimizations of weights can be reached, with possible reduction of unsprang mass.

The possible reinforcement portions 45a,45b allow to improve stiffness and resistance in the cases where the characteristics of the bulk material chosen for forming the molded portions 44a,44b are not sufficient for reaching the requirements.

In addition, the kind of connections defined by the various embodiments for the joint member 31 are relatively simple, i.e. there is no need for further components to define the interface and the connections between the upright/knuckle 10 and the arms 27, so that weight and manufacturing time are saved with respect to prior art solutions.

Indeed, only a limited number of components (i.e. the interface 12, the joint member 31, the polymeric material to be molded) is required to manufacture the assembly 1, so that the supply chain can be more simple with respect to prior art solutions.

In any case, it is possible to manufacture many assemblies 1 at the same time, by a plurality of manufacturing lines or locations, in parallel to each other, so that the requested production rate can be satisfied.

All the objects of the invention are therefore achieved.

What is claimed is:

1. A lightweight suspension assembly for a vehicle, the assembly comprising: a suspension upright comprising:
    a) a bearing connection interface for receiving at least part of a wheel bearing,
    b) a first molded portion made of a first polymeric material;
    at least one arm comprising a second molded portion made of a second polymeric material;
    at least one joint member coupling the arm to the suspension upright in such a manner to allow a relative rotation between the arm and the suspension upright about at least one rotation axis (B);
    wherein the first and second molded portions are arranged onto a first surface and, respectively, a second surface of the joint member, in such a manner that the first and second molded portions are coupled in a non-releasable manner to the joint member.

2. The assembly according to claim 1, wherein the joint member comprises a joint element made of elastically deformable material.

3. The assembly according to claim 1, wherein the joint member comprises a metal element; one of the first and second molded portions being slidably coupled to the metal element so as to allow the relative rotation.

4. A manufacturing process for manufacturing a lightweight suspension assembly for a vehicle, the lightweight suspension assembly providing a suspension upright or knuckle having a bearing connection interface for receiving at least part of a wheel bearing, a first molded portion made of a first polymeric material; at least one arm comprising a second molded portion made of a second polymeric material; at least one joint member coupling the arm to the suspension upright in such a manner to allow a relative rotation between the arm and the suspension upright about at least one rotation axis (B); wherein the first and second molded portions are arranged onto a first surface and, respectively, a second surface of the joint member, in such a manner that the first and second molded portions are coupled in a non-releasable manner to the joint member, the process comprising the steps of:
- providing a mold;
- molding the first polymeric material so as to form the first molded portion;
- molding the second polymeric material so as to form the second molded portion; wherein
- both molding steps are carried out in the mold.

5. The manufacturing process according to claim 4, wherein the molding steps are carried out at the same time.

6. The manufacturing process according to claim 4, wherein the joint member comprises a metal element, which defines at least one of the first and second surfaces and is placed into the mold before carrying out the molding steps; at least one of the molding steps being carried out by overmolding the first polymeric material or the second polymeric material onto the metal element.

7. The manufacturing process according to claim 4, further comprising
- carrying out the molding steps, while a removable insert is arranged within the mold;
- removing the insert after having carried out the molding steps, so as to free a space within the mold;
- injection molding an elastically deformable material into the space so as to form an elastically deformable joint element of the joint member.

8. The manufacturing process according to claim 4, further comprising the step of reinforcing the first polymeric material and/or second polymeric material by tapes or sheets comprising reinforcing fibers.

9. The manufacturing process according to claim 8, wherein the reinforcing step is carried out by:
- forming a skeleton comprising the tapes or sheets; and
- overmolding the first polymeric material and/or second polymeric material onto the skeleton.

10. The manufacturing process according to claim 8, wherein the tapes or sheets are made of a fiber reinforced polymer; the reinforcing step being carried out by bonding the tapes or sheets onto an outer surface of the first molded portion or onto an outer surface of the second molded portion.

11. The lightweight suspension assembly of claim 1 wherein the suspension upright is a knuckle.

* * * * *